United States Patent [19]
McLellan

[11] 4,347,561
[45] Aug. 31, 1982

[54] ALTERNATING CURRENT TO DIRECT CURRENT POWER SUPPLY

[76] Inventor: Norvel J. McLellan, 1002 N. Main St., Pleasanton, Tex. 78064

[21] Appl. No.: 217,406

[22] Filed: Dec. 17, 1980

[51] Int. Cl.³ .................................................. H02M 1/14
[52] U.S. Cl. ...................................... 363/45; 363/46; 363/127
[58] Field of Search .................................. 363/46–50, 363/89, 126, 127, 44, 45

[56] References Cited
U.S. PATENT DOCUMENTS
2,096,880 10/1937 Butler ..................................... 363/49
3,395,317 7/1968 Hanson ................................. 363/44

*Primary Examiner*—William H. Beha, Jr.

[57] ABSTRACT

An electronic device that converts alternating current to direct current with high efficiency. This is accomplished by constructing the device in such a manner that the device turns itself on slowly so that a surge resistor is not needed.

In common power supplies of this type the surge resistor accounts for a large part of the power loss. In making the surge resistor not necessary power is saved.

4 Claims, 3 Drawing Figures

ALTERNATING CURRENT TO DIRECT CURRENT POWER SUPPLY

BACKGROUND

Saving power is getting to be very important. Any device that saves more power than it takes to produce the device is useful.

SUMMARY OF INVENTION

The objective of this invention is to improve on the efficiency of alternating current to direct current power supplies by eliminating the need for the surge resistor that is usually connected in series between the alternating current power source and the input to the power supply.

DESCRIPTION OF INVENTION

Figure 1:
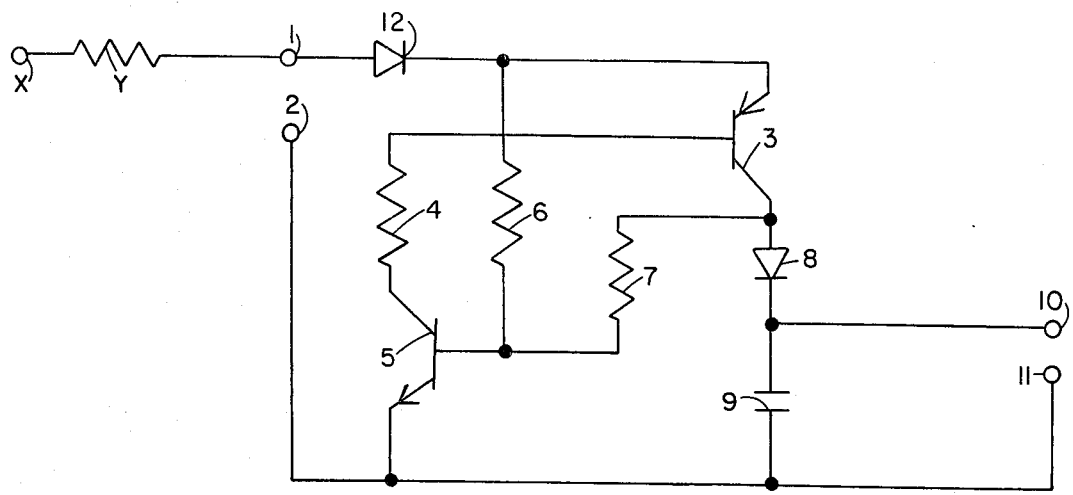
FIG. 1 is a electrical schematic of the invention that shows the use of an pnp transistor for the power passing transistor and a npn transistor 5 for the control transistor. The device can also be built with transistors of the opposite polarity.

Referring to FIG. 1, terminal X and resistor Y are not used in this device. They are used to show where they would be connected in a common type power supply.

FIG. 1 shows half wave input. Full wave input may be used by using four diodes in place of diode 12.

Terminals 1 and 2 are alternating current power input terminals. Terminal 1 is connected to one lead of diode 12. Terminal 2 is connected to the emitter of transistor 5, negative lead of capacitor 9 and power output terminal 11. Transistor 3 is PNP transistor; when it is on it passes current from the input to the output of the device. The emitter of transistor 3 is connected to one lead of diode 12 and to one lead of resistor 6. The base of transistor 3 is connected to one lead of resistor 4. The collector of transistor 3 is connected to one lead of resistor 7 and to one lead of diode 8. Resistor 4 is current limiting for collector of transistor 5 and current limiting for base of transistor 3. One lead of resistor 4 is connected to base of transistor 3 and the other lead of resistor 4 is connected to the collector of transistor 5. Transistor 5 is an NPN transistor that controls the base current of transistor 3. The collector of transistor 5 is connected to one lead of resistor 4. The base of transistor 5 is connected to one lead of resistor 6 and to one lead of resistor 7. The emitter of transistor 5 is connected to power input terminal 2. Resistor 6 passes the initial turn on current for transistor 5. One lead of resistor 6 is connected to the base of transistor 5 and the other lead is connected to emitter of transistor 3. Resistor 7 passes the main turn on current for transistor 5 and is a low resistance in relation to the resistance of resistor 6. One lead of resistor 7 is connected to base of transistor 5 and the other lead of resistor 7 is connected to the collector of transistor 3. Diode 8 prevents the charge on capacitor 9 from leaking back through transistor 3 and resistor 7 when the input voltage is lower than the voltage of capacitor 9. One lead of diode 8 is connected to collector of transistor 3 and the other lead of diode 8 is connected to one lead of capacitor 9 and to power output terminal 10. Capacitor 9 is the filter for the device. One lead of capacitor 9 is connected to one lead of diode 8 and the other lead is connected to power output terminal 11. Terminal 10 is a power output terminal and is connected to junction of capacitor 9 and diode 8. Terminal 11 is a power output terminal and is connected to power input terminal 2. Diode 12 is a power rectifier. One lead of diode 12 is connected to power input terminal 1 and the other lead is connected to junction of transistor 3 and resistor 6. The above is the half wave version. The device can be built with full wave input power.

Operation

Referring to FIG. 1, when power is initially applied and input terminal 1 is positive in relation to input terminal 2, a small current flows through resistor 6 and turns transistor 5 on and lets current flow emitter to base of transistor 3 and turns it on. The turn-on of transistor 3 lets current flow through diode 8 into capacitor 9. When capacitor 9 starts charging, current flows through resistor 7 and turns transistor 5 on further, which turns transistor 3 on further and charges capacitor 9 more and increases current through resistor 7 and so on until capacitor 9 is charged to near the peaks of the input power voltage.

The above sequence allows capacitor 9 to be charged at a slower rate than if capacitor 9 were connected directly to diode 12. This makes it practical to omit the usual surge resistor and the power it dissipates.

One other feature of the device is that if there is a short circuit across the power output terminals, current cannot build up through resistor 7 and the collector current of transistor 3 will be a very small percentage of the design current of the device. FIG. 1 is the basic circuit. Other elements can be added to improve it. A few examples are: Using a darlington hook-up for transistor 3 to improve efficiency, adding a zener diode and a resistor as shown in FIG. 2 to improve efficiency by turning transistor 3 on to saturation during its conduction, adding a zener diode, a resistor and a transistor as shown in FIG. 3 to limit the output voltage, or using a combination of the three figures.

Figure 2:
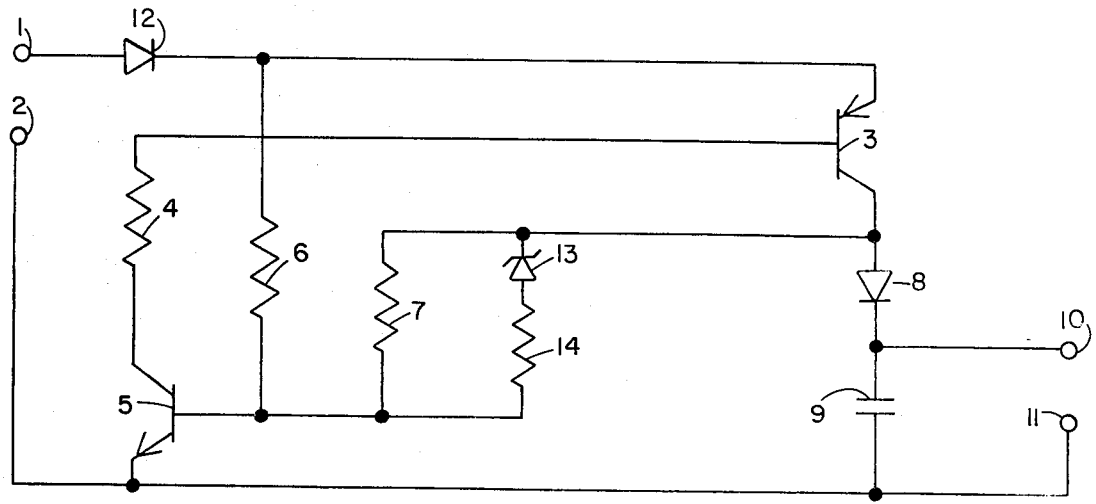
FIGS. 2 and 3 are variations of FIG. 1 to improve efficiency thereof as recited hereinafter.
Figure 3:
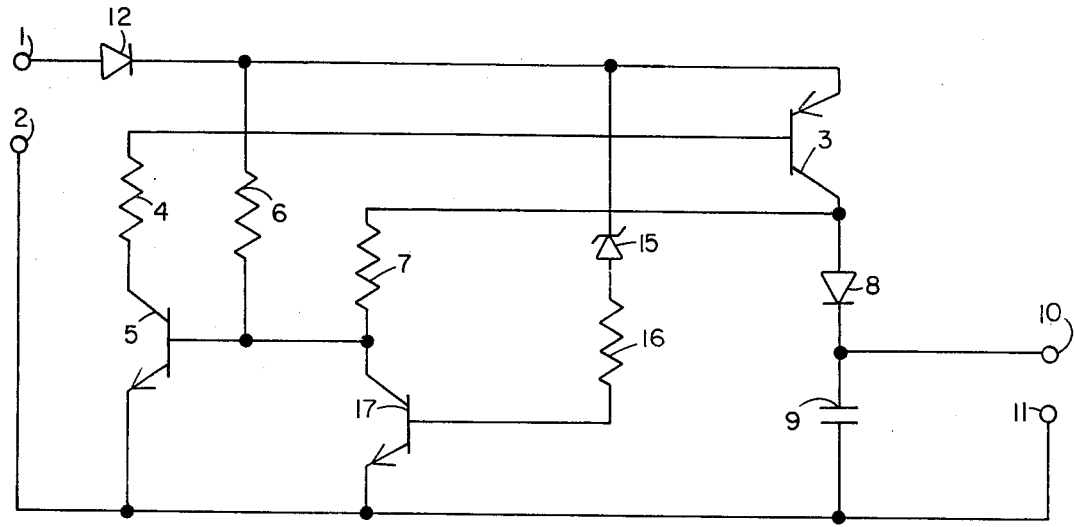

Referring to FIG. 2: Parts 1 thru 12 are connected as in FIG. 1. Parts 13 and 14 are a zener diode and a resistor connected in series and connected in the circuit with the cathode of zener 13 connected to the collector of transistor 3 and the free end of resistor 14 connected to the base of transistor 5.

Operation of FIG. 2: Parts 1 thru 12 function as in FIG. 1. When the voltage at the collector of transistor 3 reaches the break over voltage of zener 13 zener 13 conducts and turns transistor 5 and transistor 3 on to saturation. Referring to FIG. 3: Part 1 thru 12 function the same as in FIG. 1. Parts 15, 16 and 17 are a zener diode, a resistor and a transistor. The cathode of zener 15 is connected to the emitter of transistor 3, the anode of zener 15 is connected to one lead of resistor 16 and the other lead of resistor 16 is connected to the base of transistor 17. The collector of transistor 17 is connected to the base of transistor 5 and the emitter of transistor 17 is connected to the emitter of transistor 5. Operation of FIG. 3: Parts 1 thru 12 function the same as in FIG. 1. When the voltage at the emitter of transistor 3 reaches the break over voltage of zener 15, zener 15 conducts and turns transistor 17 on and transistors 5 and 3 off. This limits the out put voltage to approximately the break over voltage of zener 15.

I claim:

1. A alternating current to direct current power supply that has a power input terminal that is connected to one lead of a diode and the other lead of said diode is connected to one lead of a resistor and to the emitter of a PNP transistor and the other lead of said resistor is connected to the base of a NPN transistor and the emitter of said NPN transistor is connected to a second power input terminal and the base of said PNP transistor is connected to one lead of a second resistor and the other lead of said second resistor is connected to the collector of said NPN transistor and one lead of a second diode is connected to the collector of said PNP transistor and the other lead of said second diode is connected to one lead of a capacitor and the other lead of said capacitor is connected to said second power input terminal and one lead of a third resistor is connected to the collector of said PNP transistor and the other lead of said third resistor is connected to the base of said NPN transistor and a positive power output terminal is connected to the junction of said second diode and said capacitor and a negative power output terminal is connected to said second power input terminal.

2. A device as in claim 1 that uses transistors of the opposite polarity.

3. A device as in claim 1 that has added a zener diode and a resistor and is connected with the cathode of the zener diode connected to the collector of the PNP transistor, *one end of the added resistor connected to the anode of the zener and the other end of the added resistor connected to the base of the NPN transistor.*

4. A device as in claim one that has added a zener diode, a resistor and a NPN transistor with the cathode of the zener diode connected to the emitter of the PNP transistor, one lead of the added resistor connected to anode of the zener diode, the other lead of the added resistor connected to the base of the added transistor, the collector of the added transistor connected to the base of the NPN transistor of claim 1 and the emitter of the added transistor connected to the emitter of the NPN transistor of claim 1.

* * * * *